3,801,546
MANUFACTURE OF TEXTILE FINISHING AGENTS COMPRISING CONDENSING UREA AND HCHO FOLLOWED BY CONDENSATION WITH GLYOXAL
Harro Petersen, Frankenthal, Wilhelm Ruemens and Heinz Bille, Limburgerhof, and Guenter Reuss, Ludwigshafen, Germany, assignors to Badische Anilin- & Soda-Fabrik Aktiengesellschaft, Ludwigshafen am Rhine, Germany
No Drawing. Filed Feb. 28, 1973, Ser. No. 336,444
Claims priority, application Germany, Mar. 3, 1972, P 22 10 283.6
Int. Cl. C08g 9/10
U.S. Cl. 260—69 R  9 Claims

ABSTRACT OF THE DISCLOSURE

Manufacture of stable liquid shrink and wrinkle resist finishes for cellulosic textiles by condensing urea and formaldehyde in aqueous solution at a molar ratio of from 1:2 to 1:10 in a first stage at pH's of from 7 to 10, in a second stage at pH's of from 3.1 to 5 and in a third stage at pH's of from 6 to 7, sufficient quantities of glyoxal and additional urea and, if necessary, additional formaldehyde being added at the commencement of the third stage to give a total molar ratio of urea to formaldehyde to glyoxal of 1:1.5 to 2.5:0.0.3 to 0.6.

---

This invention relates to a process for the manufacture of stable wrinkle-resist formulations for cellulosic textile materials.

Wrinkle-resist finishes conventionally used are methylol compounds and alkoxymethyl compounds of acyclic and cyclic ureas and also melamine and carbamates. In the case of cellulosic textiles, the methylol and alkoxymethyl compounds of urea are preferred. However, these show poor shelf life when in the form of solutions.

It is thus an object of the invention to improve the shelf life of such liquid textile finishes.

We have found a process for the manufacture of stable liquid finishing agents for cellulosic textiles, which is characterized in that urea and formaldehyde are condensed in aqueous solution at a molar ratio of from 1:2 to 1:10 in a first stage at pH's of from 7 to 10, in a second stage at pH's of from 3.1 to 5 and in a third stage at pH's of from 6 to 7, sufficient quantities of glyoxal and additional urea and, if necessary, additional formaldehyde being added at the commencement of the third stage to give a total molar ratio of urea to formaldehye to glyoxal of from 1:1.5:0.3 to 1:2.5:0.6.

In the first reaction in alkaline solution, urea may be used as a solid or in solution and formaldehyde may be used in solution or in the form of pure polymer such as paraformaldehyde, trioxane or tetroxane or in the form of pure acetals. In this stage, urea is reacted with formaldehyde at a molar ratio of from 1:2 to 1:10 and preferably from 1:2.5 to 1:6, optionally in the presence of an organic base which is not reactive with formaldehyde or preferably in the presence of an inorganic caustic solution, in particular caustic soda at pH's of between 7 and 10 and preferably between 8 and 9. This condensation may be carried out at temperatures of between 20° and 80° C. and preferably between 50° and 60° C. The pH must be maintained at the specified value throughout the reaction by the addition of caustic solution as required. Depending on the temperature and pH used, the reaction is complete after from 30 minutes to 4 hours. The end of the reaction is reached when the concentration of free formaldehyde remains constant.

In place of urea, it is of course possible to use methylolation mixtures of urea with formaldehyde containing in addition to free formaldehyde for example the higher methylol compounds of urea, i.e. trimethylolurea and tetramethylolurea, as starting materials. In such a case, which will be the usual practice in smaller plants, the first reaction stage has already been performed and the present process will commence at the second stage, the condensation in acidic solution.

The condensation in the second stage is effected by adjusting the pH of the reaction mixture with an acid to a value of from 3.1 to 5 and preferably 3.5 to 4.5 and heating the mixture at from 20° to 100° C. and preferably from 50° to 90° C. until 5 drops of the reaction solution produce clearly visible turbidity in 10 ml. of a 50% aqueous solution of bitter salt (magnesium sulfate heptahydrate) or in 10 ml. of a mixture of 70 parts by volume of acetone and 30 parts by volume of water.

Suitable acids are inorganic acids such as hydrochloric, sulfuric and phosphoric acids and also relatively strong organic acids such as p-toluenesulfonic acid, oxylic acid and phthalic acid.

The reaction in the second stage may be carried out by adding an acid to the mixture or the aforementioned starting materials containing formaldehyde and then heating the mixture to the desired condensation temperature. Energy is saved, however, by adding the acid to the reaction mixture coming from the first stage whilst this is still hot.

The reaction time depends on the temperature and pH. At pH's of from 3.5 to 4, the reaction at from 90° to 100° C. may be approx. 15 minutes for example, whilst it can be four hours at pH's of from 4.5 to 5 at 30° C.

The present invention is founded on the surprising fact that when the resulting precondensates containing free formaldehyde are further reacted with urea in the presence of small amounts of glyoxal, liquid finishing agents are obtained which exhibit adequate activity and a long shelf life. To this end, the precondensates obtained in the above manner are reacted, in the third stage, with sufficient amounts of urea and glyoxal, with the addition of more formaldehyde if necessary, to give a total molar ratio of urea to formaldehyde to glyoxal of from 1:1.5:0.3 to 1:2.5:0.6 and preferably from 1:1.8:0.4 to 1:2.2:0.5. By total molar ratio we mean the ratio of the total amounts of each component present, irrespective of their degree of combination. For example, the total amount of formaldehyde is the sum of the amounts of free formaldehyde and combined formaldehyde (as methylol groups). The glyoxal is conveniently added in aqueous solution and the urea is added in aqueous solution or in crystalline form. The reaction is carried out at pH's of from 5 to 7 and preferably from 6.2 to 6.9 and at temperatures of between 20° and 60° C. and preferably between 30° and 40° C. The reaction time depends on the temperature and pH used and varies from 1 to 6 hours. The course of the reaction may be followed, for example, by progressive quantitative determination of the free formaldehyde in the solution.

The pH may be measured in various ways, and the results obtained using the above solutions are not entirely independent of the method of pH measurement used. The present specification refers to pH's measured by means of a glass electrode.

The finishing agents obtained by the process of the invention may be concentrated, if desired, to from about 80 to 85% solutions by evaporation.

The textile finishing agents thus obtained show excellent stability on storage. When stored at temperatures below 25° C., they remain usable for at least 6 months. This could not have been foreseen, particularly in view of the fact that their ability to fix to the textiles is hardly less than that of conventional texile finishing agents.

Our novel finishing agents are used in conventional manner, preferably in the form of an aqueous impregnation bath to which, in general, the catalysts necessary for crosslinking are added. Particularly suitable catalysts for this purpose are potentially acidic catalysts such as are generally known and commonly used in the finishing of textiles. Examples of suitable catalysts are the ammonium salts of strong acids, magnesium chloride, zinc chloride and zinc nitrate. It is also possible to use mixtures of two or more catalysts. The concentration of the finishing agents depends, as usual, on the effect required. It is generally from 50 to 200 g./l. The textile material to be treated is impregnated with the liquor in the usual manner, preferably with the aid of a padding machine.

The dilute solution (liquor) of the textile finishing agent manufactured in the manner of the present invention and containing for example one or more of the said potentially acidic catalysts, as is fed to the padding machine, shows greater stability than conventional liquors containing, for example, methylolated ureas produced in the manner of the prior art by a factor of from 5 to 7 (i.e. they are stable for 18 hours instead of from 2 to 3 hours as hitherto). This fact was also not foreseeable.

The impregnated material is freed from excess liquor in known manner, for example by squeezing. The impregnated textile material may be dried or substantially dried and then heated to a temperature of from 100° to 210° C. and preferably from 130° to 180° C. in the presence of the acidic or potentially acidic catalysts. Under these conditions, the reaction is generally complete after from 1 to 6 minutes. The fibrous material may be mechanically shaped, for example compressed, crimped, pressed, calendered, embossed or pleated, during or after drying. Cellulosic textile materials finished in this manner are permanently wrinkle-resistant and shrink-proof and embossed effects and pleats are substantially fast to washing.

Our new formulations may be used in conjunction with conventional nitrogen-containing hydroxymethyl or alkoxymethyl compounds and also with nitrogen-free finishing agents. They may also be used together with conventional water-repellent, softening, leveling, wetting and finishing agents, such as in particular polymer solutions or dispersions. Examples of water-repellent agents are aluminum-containing or zirconium-containing paraffin wax emulsions and silicon-containing compositions and perfluorinated aliphatic compounds. Examples of softening agents are ethoxylation products of higher fatty acids, fatty alcohols or fatty acid amides, high molecular weight polyglycol ethers, higher fatty acids, fatty alcohol sulfonates, N-stearyl-N'-N' - ethylidene urea and stearylamidomethylpyridinium chloride. Suitable leveling agents are, for example, water-soluble salts of acid esters of polybasic acids with ethylene oxide or propylene oxide adducts of long-chain alkoxylatable basic compounds. Examples of wetting agents are salts of alkynaphthalenesulfonic acids, the alkali metal salts of sulfonated dioctyl succinate and the addition products of alkylene oxides and fatty alcohols, alkylphenols, fatty amines and the like. Examples of finishing agents are cellulose ethers and cellulose esters and alginates, and also solutions or dispersions of synthetic polymers and polycondensates, e.g. solutions or dispersions of polyethylene, polyamides, ethoxylated polyamides, polyvinyl ethers, polyvinyl alcohols, polyacrylic acids or their esters and amides and solutions or dispersions of corresponding polmethacrylic compounds, polyvinyl propionate, polyvinyl pyrrolidone, copolymers, e.g. copolymers of vinyl chloride and acrylates, of butadiene and styrene or acrylonitrile and of $\alpha$ - dichloroethylene, $\beta$ - chloroalkyl acrylate or vinyl ethyl ethers and acrylamide or the amide of crotonic acid or maleic acid or of N-methylol methacrylamide and other polymerizable compounds. These additional agents are generally included in amounts of from 0.3 to 4% and preferably from 1 to 2.5% by weight of the dry textile material. These amounts may be exceeded in special cases.

In the following examples the parts and percentages are by weight, unless otherwise stated. Parts by weight relate to parts by volume as do kilograms to liters.

The solutions obtained by the methods described in Examples 1 to 4 are still perfectly clear and capable of giving the same good results after storage for 6 months at room temperature (below 25° C.), whereas an aqueous solution containing 35% of dimethylolurea shows separated solid portions after a storage period of from 1 to not more than 14 days. This reduces the content of crosslinkable substance, as manifested by poorer physical characteristics, whilst the application of such condensed portions leads to a distinct change in the handle of the textile materials treated therewith.

EXAMPLE 1

300 parts of a 40% formaldehyde solution are stirred with 60 parts of crystalline urea at pH 8 for 1 hour at 50° C. The solution is then acidified with sulfuric acid to give a pH of 4.5 to 4.8 and then stirred for a further hour at 50° C. There are then added to the solution a further 60 parts of urea and 150 parts of a 40% glyoxal solution, and the mixture is adjusted to a pH of 6.8 with dilute caustic soda and stirred for 3 hours at 50° C., this pH being maintained throughout stirring. There are thus obtained 570 parts of a 43% solution having a total molar ratio of urea to formaldehyde to glyoxal of 1:2:0.5. The content of free formaldehyde is from 1.3 to 1.4%.

EXAMPLE 2

300 parts of a 60% methylolation mixture of urea containing formaldehyde in a molar ratio of 1:4 are adjusted to a pH of 4.5 with sulfuric acid and stirred at 35° C. for 1 hour. The pH is then adjusted to 6.8 with caustic soda, and 60 parts of urea and 145 parts of a 40% aqueous glyoxal solution are added and the mixture is stirred for 4 hours at 50° C. whilst maintaining the pH at said value of 6.8. The reaction is then cooled to room temperature and filtered. 100 parts of water are added and there are thus obtained about 600 parts of a 50% solution of a finishing agent having a total molar ratio of urea to formaldehyde to glyoxal of 1:2:0.5 and a content of free formaldehyde of 1.5%.

EXAMPLE 3

A solution of 150 parts of urea in 750 parts of 40% aqueous formaldehyde solution is stirred and adjusted to a pH of 7.8 with caustic soda and then stirred for from 30 to 35 minutes at 70° C. whilst the pH is maintained at more than 7. The pH is then adjusted to from 3.5 to 4.0 with 50% formic acid and then heated at 90° C. for about 20 minutes until 5 drops of the reaction solution produce distinctly visible turbidity in 10 ml. of a 50% bitter salt solution at room temperature. After neutralizing to pH 6.8 with caustic soda and cooling to 35° C., there are added 150 parts of urea followed by 290 parts of a 40% glyoxal solution and, finally, 60 parts of water. The mixture is heated at 55° C. for 3 hours, during which period the pH must be readjusted to 6.8 several times by the addition of caustic soda. There are obtained approximately 1,400 parts of an approx. 50% aqueous solution of a textile finishing agent having a final molar ratio of urea to formaldehyde to glyoxal of 1:2:0.4.

EXAMPLE 4

A solution of 120 parts of urea in 375 parts of 40% formaldehyde solution is stirred in a vessel for 30 minutes at a pH of 7.8 and at 70° C. 50% formic acid or sulfuric acid is then added to give a pH of 4.0 and condensation is carried out for approx. 30 minutes at 70° C. until 3 drops of the reaction solution give distinctly visible turbidity in 10 ml. of a mixture of 70 parts of acetone and 30 parts of water. The mixture is then neutralized with caustic soda to pH 6.8 and cooled to 30° C. To this reaction mixture there are added 465 parts of 40% formaldehyde solution, 290 parts of 40% glyoxal solution, 180 parts of urea and 60 parts of water, and the mixture is adjusted to a pH of 6.2 with dilute caustic soda. The mixture is then stirred for 1 hour at 35° C. and adjusted to pH 6.8 with caustic soda, whereupon it is heated to 55° C. over 1 hour at an even rate and then stirred for 3 hours at 55° C., during which perod the pH must be readjusted to 6.8 several times by the addition of caustic soda. There are obtained approx. 1,500 parts of a 50% aqueous solution having a total molar ratio of urea to formaldehyde to glyoxal of 1:2.24:0.4.

EXAMPLE 5

A bleached and mercerized cotton fabric (poplin) weighing 120 g./m.$^2$ is impregnated by padding with a solution having the following composition:

120 parts of the 50% solution of textile finishing agent mixture as prepared in Example 3,
20 parts of a 40% aqueous dispersion of polyethylene,
30 parts of a 40% aqueous emulsion of s silicic acid ester and
15 parts of magnesium chloride, all diluted with water to a volume of 1,000 parts v./v.

The wet pick-up is 70%. Following impregnation, the fabric is dried on a tenter at 110° C. to a residual moisture content of about 7% and is then heated for 4 minutes at 150° C. by hot air.

The fabric thus treated has a pleasant handle and good wrinkle resistance and shows the following data:

|  | Untreated fabric | Treated fabric |
|---|---|---|
| Crease recovery angle (dry) according to DIN 5890 (warp and weft) | 96 | 235 |
| Crease recovery angle (wet) according to Total Monsanto rating, drip dry after 20 min. machine washing at 95° C.$^1$ | 187 | 248 |
|  | 1.5 | 4 |
| Tensile strength (kg.) (specimen 40 x 100 mm.) | 37.9 | 25.0 |

$^1$ Cf. AATCC Technical Manual 88A-1964 T.

EXAMPLE 6

A bleached and mercerized cotton interlining weighing 145 g./m.$^2$ is impregnated with a liquor containing, per liter, 200 parts of the 50% aqueous solution of textile finishing agent mixture as prepared in Example 3, 60 parts of a 50% aqueous polyvinyl acetate dispersion, 40 parts of a starch derivative and 35 parts of magnesium chloride, the remainder being water.

The wet pick-up is 70%. The impregnated fabric is dried at 110° C. and then heated at 155° C. for 4 minutes.

The fabric thus treated has a stiff, resilient finish, very good resistance to washing and excellent dimensional stability.

The fabric shows the data given in the following table:

|  |  | Untreated | Treated |
|---|---|---|---|
| Shrinkage (percent) after 20 min. machine wash at 95° C. | Warp | 6.5 | 1.25 |
|  | Weft | 0.75 | 0.3 |
| Shirley test bending length (cm.) | Warp | 7.6 | 13.9 |
|  | Weft | 6.1 | 11.6 |

EXAMPLE 7

Bleached and mercerized cotton fabrics are impregnated separated for the purposes of comparison, using the following liquors:

(a)

120 parts/1 of a 50% aqueous solution of a product as prepared in Example 2 and
12 parts/1 of magnesium chloride;

(b)

60 parts/1 of dimethylolurea and
12 parts of magnesium chloride;

(c)

120 parts/1 of a 50% aqueous solution of dimethylol-4,5-dihydroxyethyleneurea and
12 parts/1 of magnesium chloride.

The fabrics are padded to a wet pick-up of about 75% and then condensed for 4 minutes at 135° C. The fabric treated with the liquor (a) shows excellent wrinkle resistance which remains after washing at the boil. The fabric finished with liquor (b) shows the same degree of wrinkle resistance but much poorer resistance to washing. The finish effected with liquor (c) gives a smaller recovery angle due to the lower activity of the product.

|  | Untreated | Treated with— | | |
|---|---|---|---|---|
|  |  | (a) | (b) | (c) |
| DIN 53,890, warp and weft | 82 | 235 | 230 | 195 |
| DIN 53,890, warp and weft after washing according to DIN 53,892 at 95° C. | 78 | 240 | 165 | 170 |
| Tensile strength according to DIN 53,857, weft | 36.8 | 26.5 | 25.0 | 28.7 |

We claim:
1. A process for the manufacture of stable liquid shrink and wrinkle resist formulations for cellulosic textiles, wherein urea and formaldehyde are condensed in aqueous solution at a molar ratio of from 1:2 to 1:10 in a first stage at pH's of between 7 and 10 for from 0.5 to 4 hours at temperatures of from 20° to 80° C., in a second stage at pH's of between 3.1 and 5 at temperatures of from 20° to 100° C. until 5 drops of the reaction solution produce distinctly visible turbidity in 10 ml. of a 50% aqueous solution of bitter salts (magnesium sulfate heptahydrate), and in a third stage at pH's of between 5 and 7 for from 1 to 6 hours at from 20° to 60° C., sufficient amounts of glyoxal and additional urea and, if necessary, additional formaldehyde being added at the commencement of the third stage to give a total molar ratio of urea to formaldehyde to glyoxal of from 1:1.5:0.3 to 1:2.5:0.6.

2. A process for manufacture of stable liquid shrink and wrinkle-resist formulations for cellulosic textiles as claimed in claim 1, wherein urea and formaldehyde are used in the first stage at a molar ratio of from 1:2.5 to 1:6.

3. A process as claimed in claim 1, wherein the reaction in the first stage is carried out at pH's of between 8 and 9.

4. A process a claimed in claim 1, wherein the reaction in the firt stage is carried out at temperatures of between 50° and 60° C.

5. A process as claimed in claim 1, wherein the reaction in the second stage is carried out at pH's of between 3.5 and 4.5.

6. A process as claimed in claim 1, wherein the reaction in the second stage is carried out at from 50° to 90° C.

7. A process as claimed in claim 1, wherein the total molar ratio of urea to formaldehyde to glyoxal during the reaction in the third stage is 1:1.8–2.2:0.4–0.5.

8. A process as claimed in claim 1, wherein the reaction in the third stage is carried out at temperatures of between 30° and 40° C.

9. A process as claimed in claim 1, wherein the reaction in the third stage is carried out at pH's of between 6.2 and 6.9.

References Cited

UNITED STATES PATENTS

| 2,574,114 | 11/1951 | Lettmann et al. | 260—68 X |
| 2,876,062 | 3/1959 | Torke et al. | 260—67.5 X |
| 3,049,446 | 8/1962 | Goldstein et al. | 260—68 X |

HOWARD E. SCHAIN, Primary Examiner

U.S. Cl. X.R.

8—185; 117—132 BF, 139.4, 143 A, 161 LN; 260—29.4 R, 15, 68.71